June 5, 1928.
J. R. REPLOGLE
1,672,827
REFRIGERATING SYSTEM
Filed June 1, 1926     4 Sheets-Sheet 1
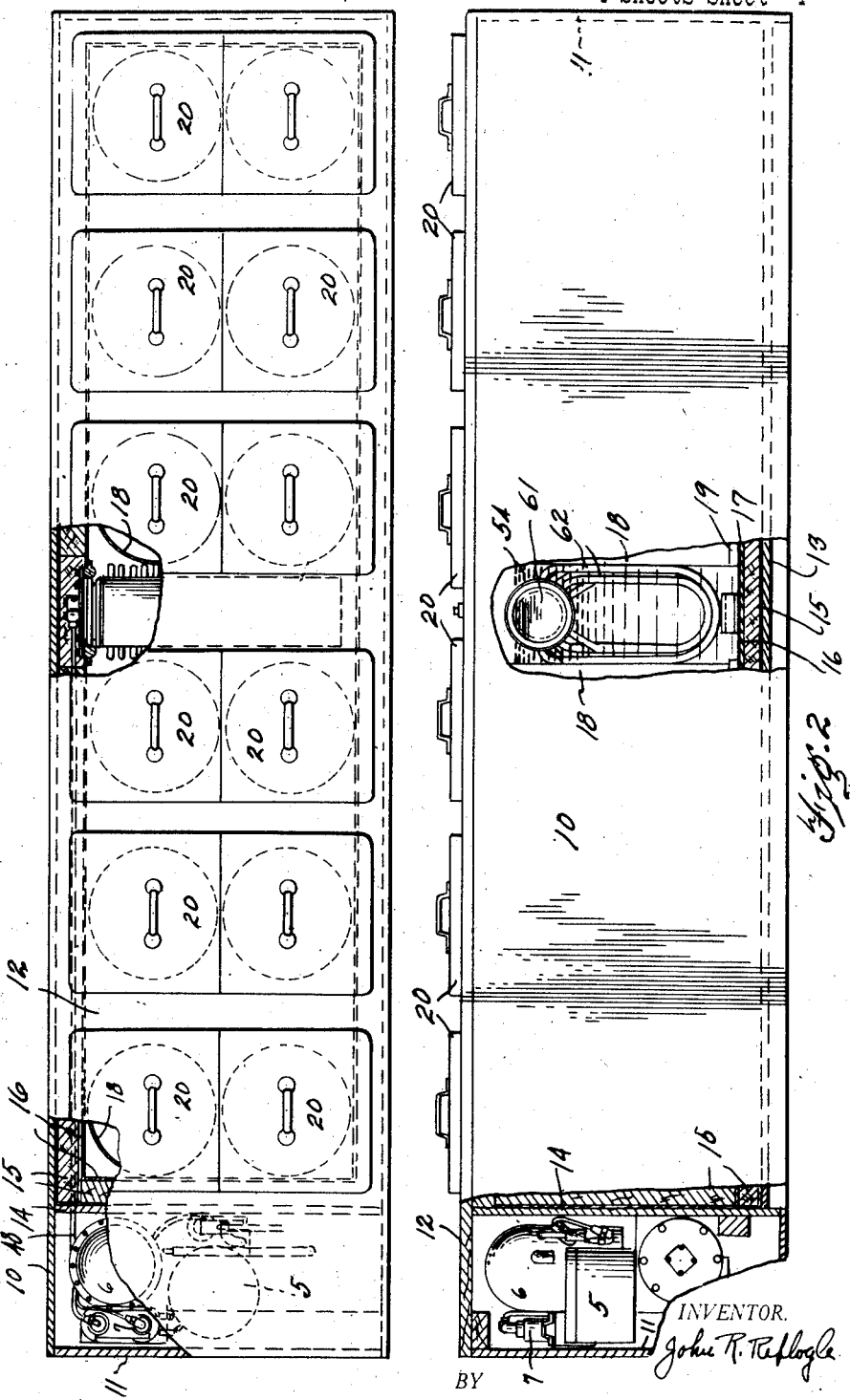
INVENTOR.
John R. Replogle
BY
Wayne M. Hart
ATTORNEY.

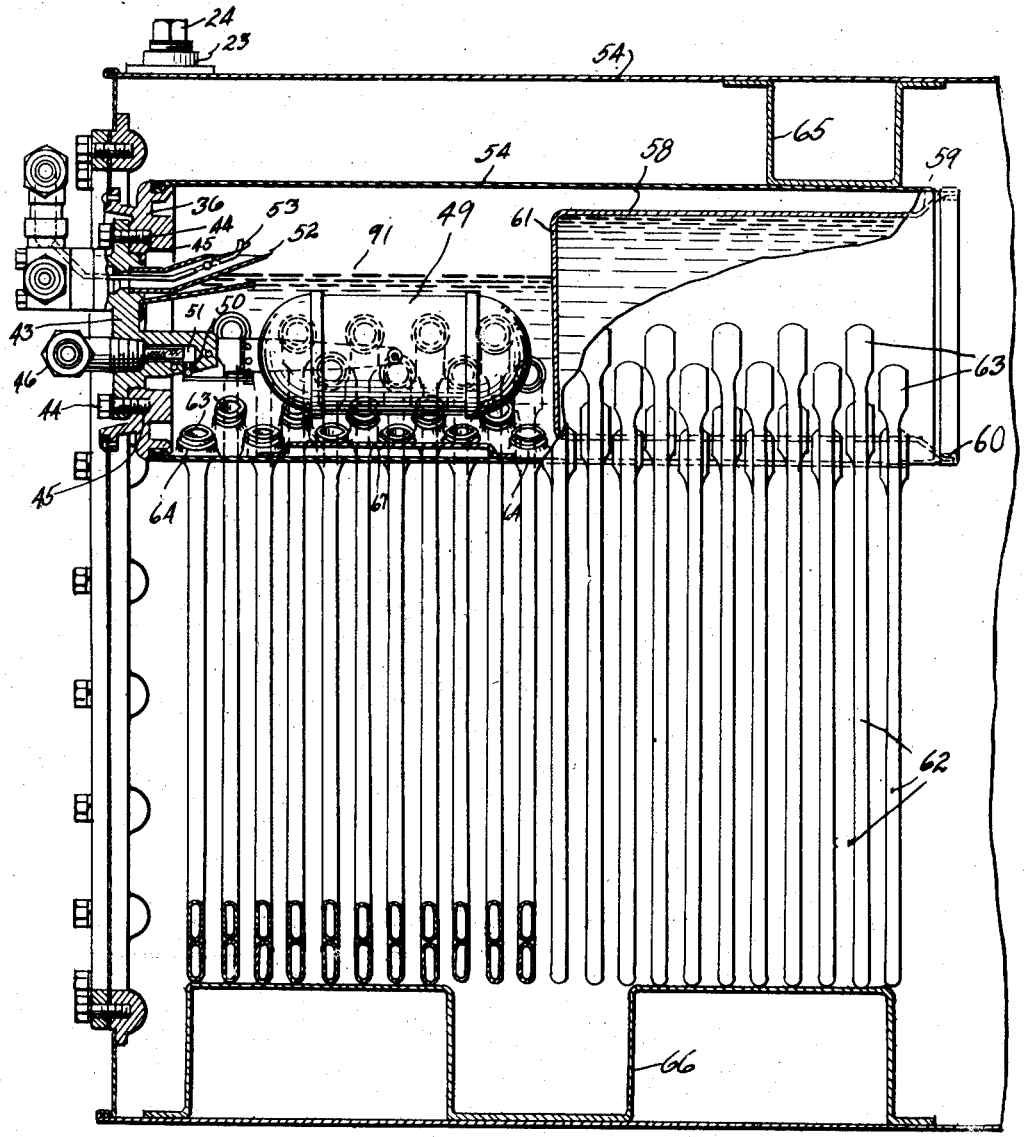

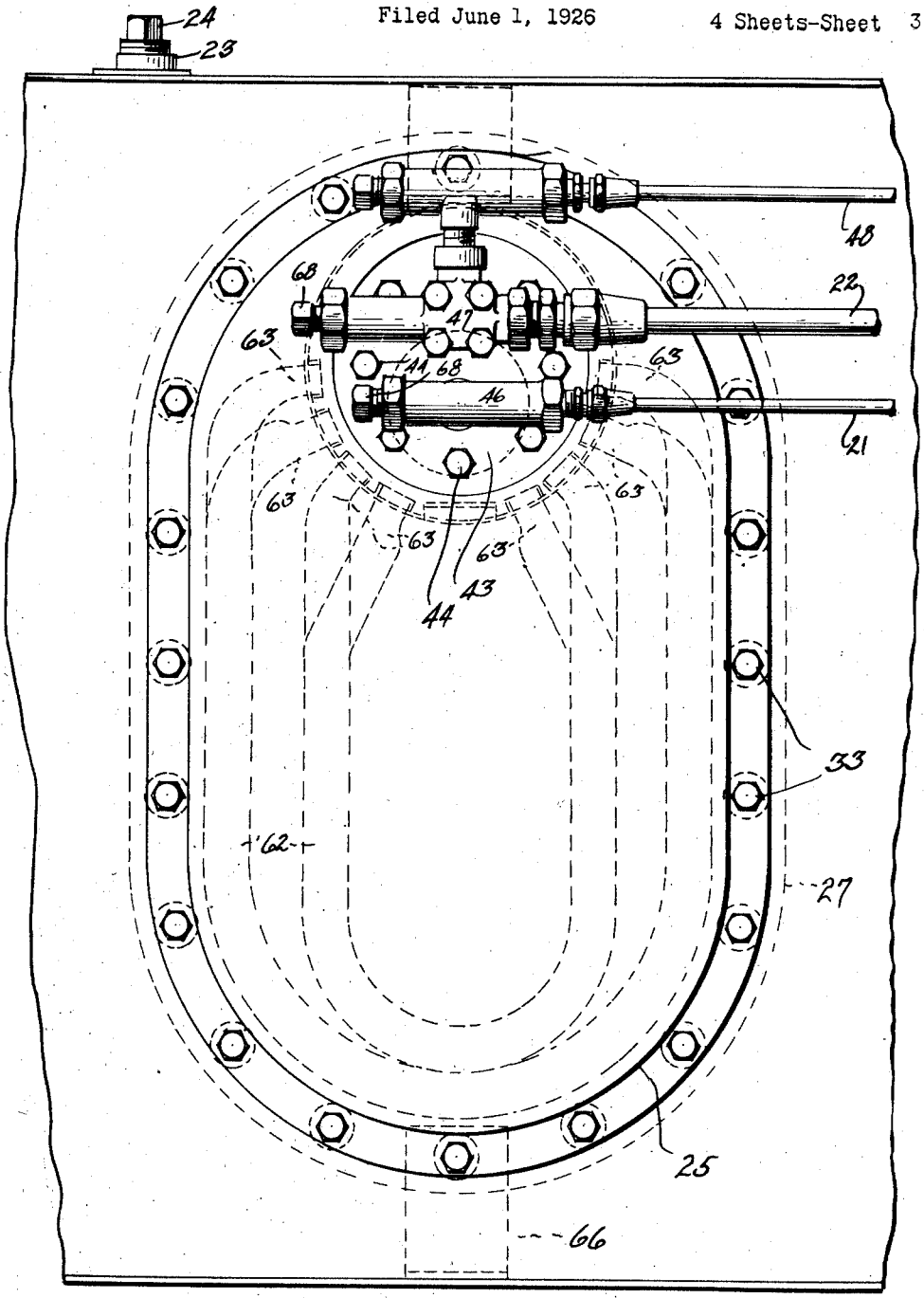

June 5, 1928.
J. R. REPLOGLE
1,672,827
REFRIGERATING SYSTEM
Filed June 1, 1926  4 Sheets-Sheet 4
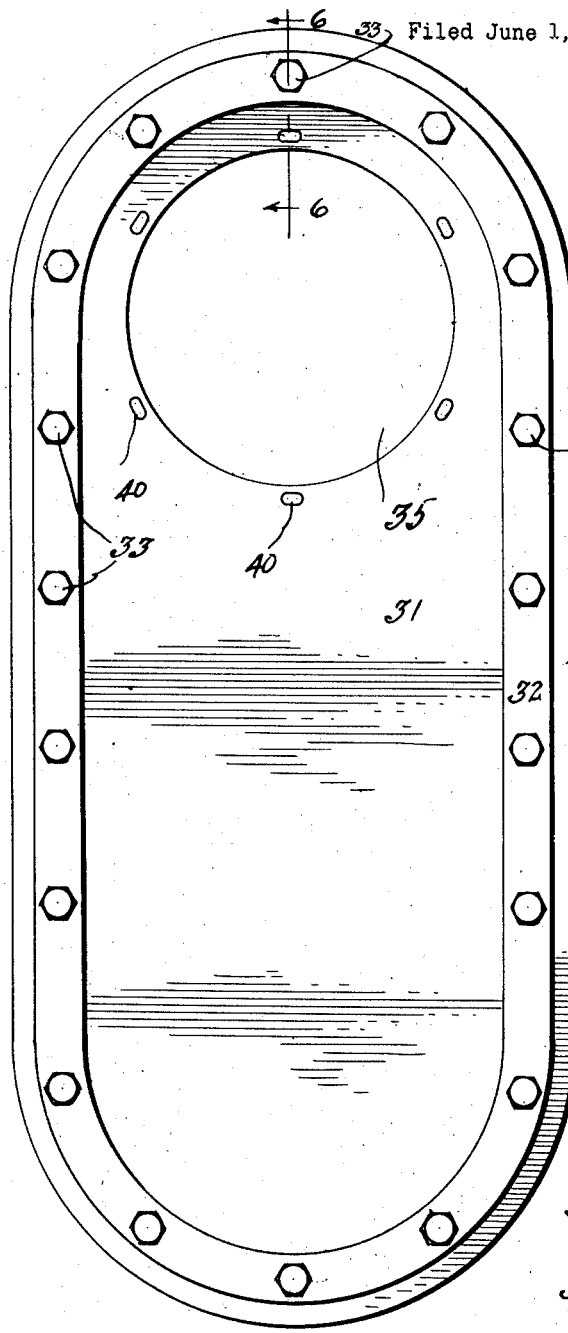
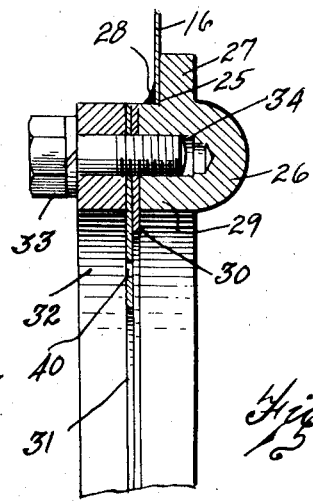
Fig.6
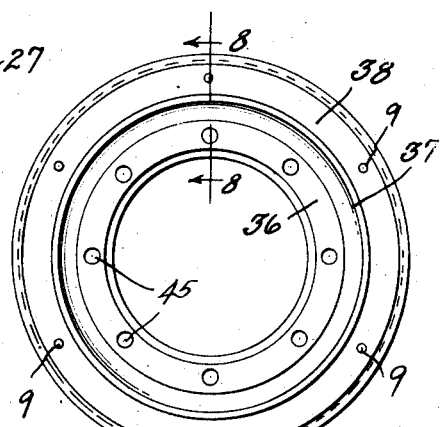
Fig.7
Fig.5
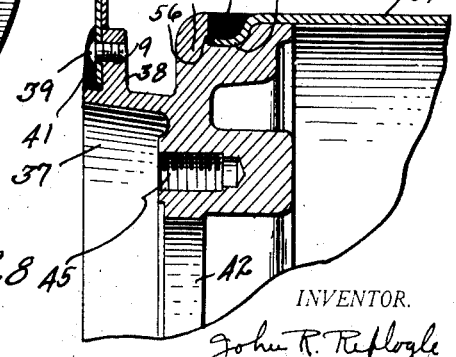
Fig.8
INVENTOR.
John R. Replogle
BY
Wayne M. Hart
ATTORNEY.

Patented June 5, 1928.

1,672,827

UNITED STATES PATENT OFFICE.

JOHN R. REPLOGLE, OF DETROIT, MICHIGAN, ASSIGNOR, BY MESNE ASSIGNMENTS, TO ELECTRIC REFRIGERATION CORPORATION, OF DETROIT, MICHIGAN, A CORPORATION OF MICHIGAN.

REFRIGERATING SYSTEM.

Application filed June 1, 1926. Serial No. 112,790.

The invention relates to refrigerating systems and more particularly to the vaporizing elements or devices of such systems, wherein a highly volatile liquid in boiling at a low temperature abstracts heat from the surrounding medium and causes a reduction of the temperature thereof; my present invention being in the nature of improvements in and relating to certain parts of a refrigerating unit invented by me, and for which an application for Letters Patent of the United States was filed on June 6, 1921, Serial No. 475,344.

It is an object of my invention to provide an improved form of vaporizing device for refrigerating systems of the flooded type, wherein the refrigerant capacity is materially reduced and the surface exposed to the medium to be cooled is greatly increased, and a more effective and rapid cooling of the surrounding medium secured; the increased vaporizing surface being secured without increasing the over all dimensions of the device.

A further object of my invention resides in providing a refrigerating system of the flooded type, in which the vaporizer can be bodily attached or removed from a tank containing a cooling fluid, thus enabling the vaporizer to be charged and shipped to a remote location and assembled as a unit with a tank, or to be bodily removed from the tank, without removing the refrigerant charge therein.

Another object of my invention is to provide a vaporizer for a refrigerating system of the flooded type in which a plurality of coils or conduits associated in open communication with a header are formed with extensive heat transferring surfaces and of small refrigerant capacity, and thus materially lessening the time required to reduce the temperature of the medium surrounding such a vaporizer and the quantity of refrigerant required.

Still another object of the invention resides in the provision of means for supporting a vaporizer within a receptacle containing a cooling fluid to prevent displacement of the vaporizer when being shipped or handled.

Other objects that are incident or ancillary to those above mentioned will appear in the following description, which sets forth a preferred embodiment of the invention.

In the drawings, Figure 1 is a plan view of a cabinet with which is incorporated a refrigerating system, some of the parts being broken away and some shown in section; Figure 2 is a side elevation of the same, broken away to show the vaporizer and certain of the supports therefor; Figure 3 is a medial sectional view of a fragmentary portion of a brine tank and of the removable vaporizer device mounted therein; Figure 4 is an end elevation of the brine tank, illustrating the closure plate with which the vaporizer forms a unitary structure; Figure 5 is an elevation of the closure plate with the vaporizer removed therefrom; Figure 6 is a fragmentary section view taken on line 6—6 of Figure 5, showing the closure plate attached to the brine tank; Figure 7 is an end elevation of the vaporizer removed from the closure plate; and Figure 8 is a fragmentary sectional view of one end of the vaporizer taken on line 8—8 of Figure 7.

Referring to the drawings by characters of reference, I have illustrated my invention associated with a food cabinet and refrigerating system of the construction described in U. S. Patent No. 1,476,546, granted to me on December 4, 1923. The cabinet consists of a frame and a casing, which include sidewalls 10, end walls 11, a top wall 12 and a bottom wall 13, the interior space formed by such walls being divided into two compartments by a vertically extending division wall or partition 14. The division wall 14 is located adjacent one of the end walls 11 of the frame, and thus provides a small compartment at one end of the casing, in which the motor 5, the compressor and condenser 6, the control mechanism 7, and the associated elements are housed. The other and larger compartment in the casing provides the refrigerated food chamber which is lined internally with heat insulating walls 15, preferably formed of cork sheeting.

A brine tank 16 is housed within the insulated compartment and rests upon a pan 17, which is seated upon the bottom insulation wall 15. The brine tank is formed with exterior leak-proof walls arranged to fit snugly within the space in the insulated compartment and such tank is provided with a plurality of vertically extending sleeves 18, which are arranged in two longitudinal lines, and, preferably, in spaced pairs. The sleeves 18 are open at both ends, and a false bottom 19 is arranged within each sleeve and rests upon the pan 17, so that the weight of food to be refrigerated which is placed within the sleeves will not separate the sealed bottom connections between the tank and the sleeves. The tank is preferably filled with brine to a level adjacent its top, so that the major portion of the sleeves 18 will be immersed and surrounded by the brine. The top wall of the cabinet is provided with a plurality of openings, through which access may be had to the upper open ends of the sleeves, and such openings are enclosed by removable lids 20.

I have illustrated a compressor, condenser, expander type of refrigerating unit which is similar to mechanism shown and described in my pending application and my patent above referred to, the compressor, motor, condenser, fluid refrigerant reservoir, and the automatic controlling switch for the motor being located either in the small compartment or at a remote location from the chamber to be refrigerated. A refrigerant supply conduit 21 extends from the refrigerant reservoir compartment 6, and a return conduit 22 is arranged to extend substantially parallel with the conduit 21 from the compressor crank case to the expander or vaporizer which is arranged within the brine tank. The vaporizer is preferably located between pairs of the food receiving sleeves 18, and one of the insulated side walls of the food compartment is cut away to receive the refrigerant conduits 21 and 22. A suitable filler neck 23 is associated with the top wall of the brine tank and projects through the top wall of the casing, a removable plug 24 being provided to close the same.

The brine tank is provided at one side with an opening 25, which is of such size that the vaporizer assembly can be bodily moved into and out of operative relation with the tank. The opening 25 in the side of the brine tank is of substantially the same shape as the section of the vaporizer and of slightly larger size, so that the vaporizer can be assembled and removed endwise. A beading member 26 extends interiorly of the opening in the tank wall, and a flanged portion 27 thereof projects adjacent a portion of the tank surrounding the opening and provides a base against which the beading is sweated and then secured in leak-proof relation by solder, such as shown at 28. The flange 27 is assembled to extend interiorly of the tank, and a portion 29 of the beading extends exteriorly of the tank wall through the opening 25. A soft gasket 30 is arranged to bear against the exterior face of the projecting beading portion 29, and a closure plate 31 of substantially the same size as the opening in the brine tank is arranged to be assembled against the soft gasket 30. A retaining ring 32 bears against the peripheral portion of the outer face of the closure plate and is arranged in alignment with and conforms to the shape of the soft gasket 30 and the projecting portion 29 of the beading. The closure plate 31 is removably secured and clamped into position by the ring 32, which is drawn against the beading 26 by a plurality of bolts 33, which extend through the ring, closure plate and soft gasket, and are screwed into the threaded apertures 34 in the beading member 26.

The vaporizer is secured to the removable closure plate 31 and forms therewith a unitary assembly which can be removed from or attached to the tank 16, the removable bolts 33 securing the unit assembly in leak-proof relation with the beading secured to the tank. The closure plate 31 is provided with an annular opening 35 adjacent its upper end and with a plurality of elongated slots 40 arranged annularly adjacent such opening. The vaporizer includes an annular head portion 36, from which extends an annular flange 37 having an annular portion 38 projecting from its exterior wall. The exterior diameter of the flange 37 is substantially the same as that of the opening 35 in the plate 31, so that it can be extended through the opening 35 with the outer face of the portion 38 bearing against the inner face of the closure plate 31. Suitable screws 39 extend through the elongated slots 40 and are screwed into threaded openings in the portion 38 of the flange. The slots 40 are elongated to permit limited annular adjustment of the vaporizer when assembled with the closure plate, and the joint between the header and the closure plate is sealed by solder, as shown at 41, after desired annular adjustment has been made. The outer end of the member 36 of the vaporizer interiorly of the flange 37 is provided with a central aperture 42 which is closed by the member 43, having passages through which refrigerant passes into and out of the vaporizer. The closure plate 43 is removably secured to the vaporizer end member 36 by bolts 44, which are screwed into the threaded apertures 45 in the end member 36. The removable closure plate 43 is connected with the refrigerant inlet conduit 21 by a coupling elbow 46 and is also connected with the outlet conduit 22 by a coupling elbow 47. A coupling to which is attached a conduit 48 is arranged to extend from coupling 47, so that the pressure in the vaporizer will be directed to suitable mechanism for controlling the operation of the motor.

The removable closure plate 43 carries valve mechanism consisting of a pivotally supported float 49, which controls a ball valve 50 seated against the outlet end of the refrigerant supply passage 51, with which the inlet connection 46 is in open communication. A conduit 52, provided with an interior open end, is arranged to communicate with the outlet connection 47, through the end plate, and such conduit is also provided with an opening 53 arranged through a wall thereof below the open end. The outlet conduits for the refrigerant, the inlet conduits and float valve controlling mechanism and the association of the conduits 21, 22 and 48 with the vaporizer are fully described in my pending application above referred to. The vaporizer illustrated is of the full flooded type and a substantially constant level of liquid refrigerant 90 and lubricant 91 is automatically maintained within the header by the float 49. A cylindrical header casing 54 is provided with a reduced end 55, which is arranged to fit tightly within an annular groove 56 in the vaporizer end member 36, and such end of the casing is secured in leak proof relation with the end member by filling the recess with solder, as shown at 57.

The other end of the cylindrical casing 54 is provided with a re-entrant end closure member 58, which is preferably formed of sheet metal and annular in cross section, being of less diameter than the inner wall of the casing 54 throughout the header portion thereof. The outer end 59 of the re-entrant head is open and is flared outwardly and secured rigidly with the casing by bending the end 60 of the casing around the end of the re-entrant head and sealing such joint with solder. In order to displace a maximum quantity of refrigerant, the re-entrant head is formed of such lengths that it extends interiorly of the casing 54 with its closed end 61 adjacent the float 49, and is spaced from the inner wall of the major portion of the casing 54 to provide a maximum heat transferring wall. The re-entrant head serves to displace the quantity of refrigerant which would be normally required within the casing 54, and also permits the brine in the tank 16 to extend interiorly of the vaporizer. The re-entrant head thus serves to provide additional wall space for transferring heat from the brine to the refrigerant, and a greater transferring surface is provided between the refrigerant in the vaporizer and the brine in the header. With this arrangement, the quantity of refrigerant required in the system and in the vaporizer is materially reduced, and the additional heat transferring surface will cause the refrigerant to maintain a desired temperature of the brine more efficiently and in a shorter space of compressor operating time.

The vaporizer consists, further, of a plurality of depending pipe loops 62, which are preferably U-shaped and are associated with the header 54 in a manner such that their open ends will project interiorly of the header below the level of the liquid refrigerant. The open ends 63 of the pipe loops are preferably circular in section, and project through openings provided to receive the same in the casing. The ends of the tubes are secured rigidly and in leak proof relation with the casing 54 by means of solder, such as shown at 64 internally of the casing. The ends of the tubes 62 are in open communication with the interior of the casing 54, so that the liquid refrigerant within the header will flow into the tubes and vaporize therein. In order to maintain a uniform temperature of the brine in a cabinet of the size illustrated, I employ two rows of tubes 62, the outer row of which is secured with the header in a plane above the inner row, and extend downwardly in spaced relation from the inner row, the lower end of the looped portion of the inner row bearing against the upper face of the looped lower portion of the outer row. The inner and outer rows of tubes are preferably spaced apart, as described, and are arranged with their major portions in alignment transversely of the casing. The major portion of the tubes 62 are drawn from a round to a substantially rectangular shape, such that the adjacent sides are flat surfaces and provide an internal area which is considerably less than that of the round ends of the tubes. Alternate tubes 62 in each row are arranged with one end associated with the casing 54 in a plane above the opposite end, this arrangement insuring the flow of refrigerant into the tubes from the header. The tubes in each row preferably extend in alignment longitudinally of the header 54 and serve the function of providing heat transferring surfaces, in which the refrigerant expands. The tubes, it will therefore be noticed, form a continuation of the header 54, and form a vaporizer in which the expansion of the refrigerant will take place substantially the height and width of the brine tank intermediate the central pairs of sleeves. By drawing and flattening the tubes 62, I am able to assemble a greater number of them with the casing 54 than would be the case if they were round, and this construction of the tubes also reduces the quantity of refrigerant required and provides spaces between adjacent tubes in each row, thus affording increased efficiency due to the increased heat transferring surfaces in contact with the brine in the tank, and also effecting a more efficient and uniform convection of the brine in the tank when the refrigerant is expanding.

It will be seen, as above described, that the vaporizer is suspended in the tank by being secured to the closure plate 31 by means of the screws 39 which secure the end member 36 therewith. I have found that additional support is sometimes necessary to prevent misplacement of the vaporizer when being shipped, or when the cabinet is handled, and for this purpose I provide an upper supporting bracket 65 and a lower supporting bracket 66. The upper bracket 65 is secured to the interior top wall of the brine tank, and extends downwardly the desired distance to engage the top of the header 54 adjacent its end 60. The lower bracket 66 is secured to the bottom of the brine tank and extends upwardly to engage the lower loop of the vaporizer tubes 62. The vertically extending portions of the U-shaped outer row of tubes 62 are of sufficient width, such that they will lie adjacent and be supported by two pairs of food sleeves 18. It will thus be seen that the brackets 65, 66 and the arrangement and width of the outer row of tubes 62 are such that displacement of the vaporizer is prevented, which, together with the securement of the end member 36, provides a rigid structure associated in a manner such that there will be no separation of the joints.

The ends 63 of the vaporizer tubes project interiorly of the casing 54, and any sudden or violent movement of the pivoted float 49 would cause it to strike against the edges at the ends of the tubes. The ends of the tubes are also arranged in a plurality of vertical planes, and it would be possible for one end of the float to become wedged between opposite projecting ends of the tubes. In order to prevent damage to the float 49, and to prevent its becoming stuck between the ends of the tubes, I provide a bracket 67, which is secured to the interior bottom portion of the casing beneath the float 49 in a position to prevent the float from contacting with the tubes' ends.

The vaporizer is preferably located transversely of the food cabinet, within the brine tank, and intermediate the two central pairs of food compartment sleeves. This arrangement and location of the vaporizer will cause uniform convection currents of the brine within the tank on each side of the vaporizer, thereby insuring substantially an even temperature of the brine throughout the tank. The term "brine" as used herein can be interpreted as any type of fluid which is commonly used in refrigeration for heat transferring purposes. The function and advantages of this construction of vaporizer, including the construction of the casing and the tubes and their arrangement will have the same advantages for transferring heat from air as for transferring heat from brine in a tank.

Great difficulty is experienced in the field and in servicing vaporizers when it is necessary to inject the refrigerant at the place of installation, as a special type of equipment is necessary for this purpose. With the vaporizer structure herein described, I am able to assemble the vaporizer and charge it at the place of assembly prior to shipment for assembly, suitable closure valves 68 being provided in the connections 46 and 47 for such purpose, and the conduits 21, 22 and 48 being removably attached exteriorly of the closure valves.

It will be observed that I have provided an efficient vaporizer structure, which utilizes a minimum quantity of refrigerant. The vaporizer being bodily attachable to or removable from a brine tank will materially reduce the time required for assembly and servicing, and provides an efficient manner of shipping such a structure after being charged with refrigerant for assembly with a cabinet at a remote distance.

While I have shown the particular embodiment of my invention, I contemplate that changes may be made therein without departing from the spirit of the invention and the scope of the appended claims.

What I claim is:

1. In a refrigerating system for food cabinets, the combination of a brine tank, a plurality of spaced food receiving sleeves in said tank, a vaporizer within said tank, including a header and depending pipe loops, said header having one end secured to a side wall of said tank, and means supporting said loops to prevent displacement of said vaporizer.

2. In a refrigerating system, the combination of a vaporizer; a brine tank in which said vaporizer is positioned, said tank having an opening in one of its side walls through which said vaporizer can be bodily inserted and removed; and a closure plate detachably secured to close the opening in the wall of said tank, said vaporizer being secured upon said closure plate.

3. In a refrigerating system, the combination of a vaporizer; a brine tank, said tank having an opening in a side wall through which said vaporizer can be bodily inserted and removed; and means for supporting said vaporizer within said tank and for sealing the opening in the wall of said tank.

4. In a refrigerating system, the combination of a vaporizer including a header and depending pipe loops having their ends in open communication with said header; a tank containing a cooling fluid in which said vaporizer is submerged, said tank having an opening in one of its walls of a size to permit said vaporizer to be moved bodily therethrough; and a closure plate detachably secured to the wall adjacent the opening in one end of the header of said tank, said vaporizer being secured to and carried by said plate and having a refrigerant inlet and outlet extending through said plate.

5. In a refrigerating system, the combination of a vaporizer including a header having a refrigerant inlet and outlet through one end; a tank containing cooling medium in which said vaporizer is submerged, said tank having an opening in one of its walls through which said vaporizer can be bodily inserted and removed; a closure plate removably secured to said tank closing the opening in the wall thereof, said closure plate having an opening therein through which the end of said header having the inlet and outlet passages therethrough extends and is secured as a unitary assembly.

6. In a refrigerating system, the combination of a vaporizer including a header portion, a brine tank, said tank having an opening in one of its side walls of a size to permit endwise insertion of said vaporizer, a beading secured to the edge of said tank around the opening therein, a closure plate removably secured to said tank and said beading, said vaporizer being mounted as a unitary structure with said plate for assembly with and removal from said tank.

7. In a vaporizer for a refrigerating system of the flooded type, a header having refrigerant inlet and outlet passages, a closure valve for said inlet passage, a float pivotally mounted within said header for controlling said valve and automatically maintaining substantially a constant level of refrigerant tubes depending from and having their ends extending through and secured to the wall of said header, and means within said header to limit the movement of said float and prevent its contact with the ends of said tubes.

8. In a vaporizer for refrigerating system of the flooded type, a header having refrigerant inlet and outlet passages, a valve for said inlet passage, a float pivotally mounted within said header for controlling said valve, looped tubes depending from and having their ends extending through and secured to the wall of said header, a bracket secured to the inner wall of said header, said bracket preventing contact of said float with the ends of said tubes.

9. In an artificial refrigerating system, a cooling unit comprising a receptacle in which a quantity of liquid refrigerant is maintained, said receptacle having a reentrant wall portion and inlet and outlet ports connected in the refrigerant circuit of the system, and a casing associated with the wall of said receptacle which includes the re-entrant portion to define a brine chamber.

10. In an artificial refrigerating system, a cooling unit comprising a vaporizer having a re-entrant wall portion, said vaporizer being associated in circuit with the system, and a casing substantially surrounding said vaporizer and defining therewith a brine containing chamber.

In testimony whereof, I hereunto affix my signature.

JOHN R. REPLOGLE.